United States Patent
Chen et al.

(10) Patent No.: US 11,852,210 B2
(45) Date of Patent: Dec. 26, 2023

(54) MEMBRANE INTEGRATED LAMINA EMERGENT TORSION JOINT

(71) Applicant: Brigham Young University (BYU), Provo, UT (US)

(72) Inventors: Guimin Chen, Provo, UT (US); Larry Howell, Orem, UT (US); Spencer Magleby, Provo, UT (US)

(73) Assignee: Brigham Young University, Provo, UT (US)

( * ) Notice: Subject to any disclaimer, the term of this patent is extended or adjusted under 35 U.S.C. 154(b) by 0 days.

(21) Appl. No.: 18/056,522

(22) Filed: Nov. 17, 2022

(65) Prior Publication Data

US 2023/0085758 A1    Mar. 23, 2023

Related U.S. Application Data

(63) Continuation of application No. 16/238,028, filed on Jan. 2, 2019, now Pat. No. 11,549,563.

(60) Provisional application No. 62/740,868, filed on Oct. 3, 2018.

(51) Int. Cl.
*F16F 1/02* (2006.01)

(52) U.S. Cl.
CPC .................... *F16F 1/027* (2013.01)

(58) Field of Classification Search
CPC ...... F16F 1/027; F16F 1/00; F16F 1/02; F16F 1/025; F16F 1/34
USPC ....................................................... 403/220
See application file for complete search history.

(56) References Cited

U.S. PATENT DOCUMENTS

| | | | |
|---|---|---|---|
| 5,024,031 A * | 6/1991 | Hoberman | E04B 1/3441 52/109 |
| 6,082,056 A | 7/2000 | Hoberman | |
| 7,093,827 B2 | 8/2006 | Culpepper | |
| 7,338,398 B2 | 3/2008 | Whiting et al. | |
| 8,084,117 B2 * | 12/2011 | Lalvani | B31D 3/04 52/670 |
| 8,171,804 B2 | 5/2012 | Knipe | |
| 8,584,456 B1 * | 11/2013 | McKnight | H02N 10/00 60/527 |
| 9,157,497 B1 | 10/2015 | Magleby et al. | |
| 9,709,793 B1 * | 7/2017 | Seltzer | H01Q 1/288 |

(Continued)

FOREIGN PATENT DOCUMENTS

| | | |
|---|---|---|
| CN | 1032688 A | 5/1989 |
| CN | 108025531 A | 5/2018 |

OTHER PUBLICATIONS

English translation of First Office Action for Chinese Application No. 201980071980.5, dated Jul. 12, 2022, 7 pages.

(Continued)

*Primary Examiner* — Christopher Garft
*Assistant Examiner* — Michael McDuffie
(74) *Attorney, Agent, or Firm* — Brake Hughes Bellermann LLP

(57) ABSTRACT

A lamina emergent torsional (LET) joint that includes an integrated membrane to reduce, or eliminate, certain unwanted motions and/or displacements associated with the operation of the LET joint is disclosed. The membrane-integrated LET joint (i.e., M-LET) can be used as a hinge for a lamina emergent mechanism and/or as a surrogate fold for an origami application to ensure accurate and repeatable transitions from a planar (i.e., lamina) state to a non-planar (i.e., lamina-emergent) state, and vice versa.

18 Claims, 14 Drawing Sheets

(56) References Cited

U.S. PATENT DOCUMENTS

| | | | | |
|---|---|---|---|---|
| 10,422,124 | B1* | 9/2019 | Alfattani | F16H 21/54 |
| 10,506,708 | B2 | 12/2019 | Defigueiredo et al. | |
| 11,340,261 | B2* | 5/2022 | Mazzeo | G01R 1/0735 |
| 11,549,563 | B2* | 1/2023 | Chen | F16F 1/027 |
| 2012/0234508 | A1* | 9/2012 | Lusk | B25J 9/08 |
| | | | | 160/236 |
| 2012/0245557 | A1* | 9/2012 | Albrechtsen | A61M 5/3129 |
| | | | | 604/506 |
| 2016/0040828 | A1* | 2/2016 | Henke | A47C 5/005 |
| | | | | 428/80 |
| 2017/0219007 | A1 | 8/2017 | Lang et al. | |

OTHER PUBLICATIONS

Extended European Search Report for European Application No. 19868415.1, dated Jun. 20, 2022, 8 pages.

First Office Action for Chinese Application No. 201980071980.5 along with English translation, dated Jul. 12, 2022, 14 pages.

Greenberg; "The Application of Origami To the Design of Lamina Emergent Mechanisms (LEMS) With Extensions To Collapsible, Compliant and Flat Folding Mechanisms"; Brigham Young University, BYU ScholarsArchive, Apr. 30, 2012; 65 pages.

International Search Report and Written Opinion for Application No. PCT/US2019/054267, dated Dec. 2, 2019, 9 pages.

Turner et al.; "A Review of Orignami Applications in Mechanical Engineering"; Journal of Mechanical Engineering Science, vol. 230, No. 14, 2016; pp. 2345-2362.

G. Chen et al.: "Membrane-Enhanced Lamina Emergent Torsional Joints for Surrogate Folds", Journal of Mechanical Design, vol. 140, Jun. 2018, 10 pages.

G. Chen et al.: "Symmetric Equations for Evaluating Maximum Torsion Stress of Rectangular Beams in Compliant Mechanisms", Cin. J. Mech. Eng. (2018) 31:14, 7 pages.

Jacobsen et al.; "Lamina Emergent Torsional (LET) Joint" Mechanism and Machine Theory 44 (2009); pp. 2098-2109.

J. Ku: "Folding Thick Materials Using Axially Varying Volume Trimming", Proceedings of the ASME 2017 International Design Engineering Technical Conferences & Computers and Information in Engineering Conference, IDETC/CIE 2017, Aug. 6-9, 2017, Cleveland, USA, pp. 1-7.

S. Zirbel et al.: "Accommodating Thickness in Origami-Based Deployable Arrays", Journal of Mechanical Design, vol. 135, Nov. 2013, 11 pages.

* cited by examiner

MEMBRANE INTEGRATED LAMINA EMERGENT TORSION JOINT

CROSS-REFERENCE TO RELATED APPLICATION

This application is a continuation of U.S. application Ser. No. 16/238,028 filed on Jan. 2, 2019, which claims the benefit of U.S. provisional patent application No. 62/740,868, filed on Oct. 3, 2018. The contents of these applications are incorporated herein by reference in their entirety.

STATEMENT REGARDING FEDERALLY FUNDED RESEARCH

This invention was made with government support under Grant No. 1663345 awarded by the National Science Foundation. The government has certain rights in the invention.

FIELD OF THE DISCLOSURE

The present disclosure relates to compliant mechanisms and more specifically to a lamina emergent torsion (LET) joint with an integrated membrane.

BACKGROUND

Compliant mechansims are deformable, single-piece structures that are configured to transfer an applied force and/or deplacement via the elasticity of the sturcture. Lamina emergent mechanisms (LEMs) are subset of compliant mechanisms. LEMs are typically fabricated from a planar material (i.e., lamina). An LEM can be configured (e.g., via an applied force) into a shape that is non-planar via a motion that emerges from the plane of fabrication (i.e., fabrication plane). This motion can be facilititated by one or more LET joints.

LET joints can also be used for surrogate folds. Surrogate folds behave like preformed folds in a lamina that specify a preferred fold location, and in some cases, define a preferred (or required) folding direction. Surrogate folds can be useful in origami-based applications, which require folding in preferred locations and/or directions to operate properly.

Operation of a LEM and/or a surrogate fold may depend largely on the function of the LET joint. LET joints having relatively unrestrained rotation (i.e., low torsional stiffness) about a joint axis (i.e., folding axis, hinge axis, etc.) and a relatively restrained motion (i.e., high stiffness) in other directions are desirable for applications requiring precision and repeatability. A need, therefore, exists for new LET joints that provide low torsional stiffness about a joint axis while maintaining high stiffness in the other directions.

SUMMARY

In general, the present disclosure describes an LET joint that includes a membrane to reduce, or eliminate, certain motions and/or displacements associated with the operation (e.g., movement) of the LET joint. The membrane-integrated LET joint (i.e., M-LET) can be used as a hinge for a lamina emergent (i.e., pop-up) mechansim and/or as a surrogate fold (e.g., for an origami-based mechanism). The membrane ensures accurate and repeatable transitions of the LET-joint from a planar state (i.e., unfolded confiuration) to a non-planar state (i.e., folded configuration), and vice versa.

A membrane-integrated LET joint is described as one possible implementation of the disclosure. The membrane-integrated LET joint includes torsional segments that are substantially parallel to one another. Each torsional segment is capable of a twisting motion along a length between end portions of each torsional segment. A first member and a second member are coupled by the torsional segments and can be configured into a folded configuration or an unfolded configuration by a hinge movement facilitated by the twisting motion of one or more of the torsional segments. The membrane-integrated LET joint includes a membrane that is coupled to at least the first member and the second member. The membrane allows the hinge movement but reduces, or prevents, other movements.

In some implementations, the hinge movement may include the twisting of one or more of the torsional segments, while the other movements may include an in-plane tensile deflection and/or an in-plane rotational deflection of one or more of the torsional segments. Additionally, the other movements may include a motion in a direction that diminishes a separation between torsional segments. Accordingly, in some implementations, the LET joint can further include a stop block to reduce or prevent this other movement as well.

A method for reducing parasitic motion in a lamina emergent mechanism is described as another possible implementation of the disclosure. The method includes coupling (e.g., bonding) a membrane to a planar layer that defines a plurality of torsional segments between a first member and a second member. The method also includes folding the first member and the second member. The folding operation includes applying a force to the first member or the second member. This applied force results in (i) a twisting motion of at least one of the plurality of torsional segments and (ii) a parasitic motion of at least one of the plurality of torsional segments. The membrane is used to allow the twisting motion but to resist the parasitic motion.

A surrogate fold for an origami mechanism is described as another possible implementation of the disclosure. The surrogate fold includes a first member and a second member that are configurable into a folded configuration or an unfolded configuration base on a movement provided by a LET joint that is coupled between the first member and the second member. A membrane is adhered to a planar surface defined by the first member and the second member in the unfolded configuration. The membrane allows for a first hinge movement of the LET join in a first direction and resists a second hinge movement of the LET in a second direction that is opposite to the first.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

A particular area of a rigid, planar material may formed into a structure to provide flexibility to the normally rigid planar material. The planar material may be selected from a variety of materials types based on properties related to rigidity, formability, thermal expansion, or the like. For example, material types suitable for the planar material may include (but are not limited to) metals, plastics, and crystalline types. The dimensions of the structure formed in the planar material may be scaled according to the application to be large (e.g., meters) or small (e.g., microns). Forming the structure may be accomplished in various ways including (but not limited to) processes that include molding, machining, or etching. The structure may include rigid members formed in a unitary piece of material, or may include members and structures formed from different pieces of material and coupled (e.g., welded, bonded, fastened, etc.) together to form the mechanism.

One such structure is a lamina emergent torsional (i.e., LET) joint and a lamina emergent mechanism (LEM) may be fabricated to include one or more LET joints. The LET joints facilitate movement of members (i.e., facets, sides, etc.) from an unfolded (i.e., planar, lamina) state (i.e., configuration) into a folded (i.e., non-planar, lamina-emergent) state (i.e., configuration). For example, an LET joint may provide a hinge motion between a first member and a second member. To provide the hinge motion, a LET joint can include two (or more) parallel sets of torsional segments. The arrangement of the torsional segments and the members can be embodied variously to accommodate various hinge requirements, including (but not limited to) range of motion, ease of motion, and folding width (radius).

Figure 1A:
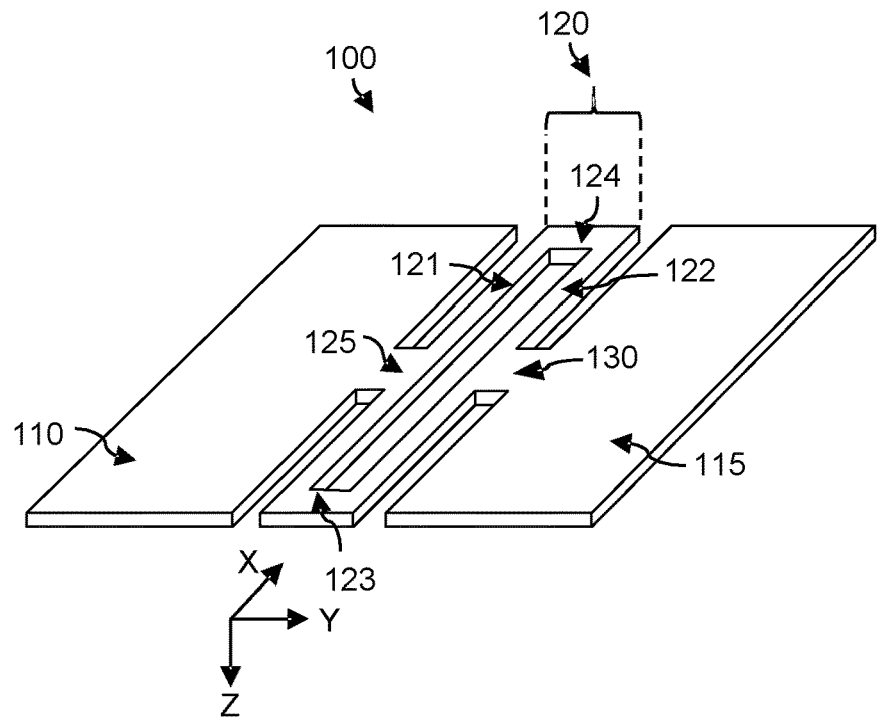
FIG. 1A is a perspective view of a possible implementation of an outside LET joint in an unfolded configuration according to a possible implementation of the present disclosure.

An LET joint implementation that couples the first and second members at exterior edges by a set of two (or more) torsional segments is called outside LET joint. A perspective view of an implementation of an outside LET joint is shown in FIG. 1A. The example outside LET joint 100 shown in FIG. 1A is formed from a unitary piece of planar material and includes a first member portion (i.e., first member) 110, a second member portion (i.e., second member) 115, and torsional segments 120. The number of torsional segments in a LET joint may be based on requirements of the LET joint, such as flexibility and bending radius. The implementation shown in FIG. 1A includes a first torsional segment portion (i.e., first torsional segment) 121 and a second torsional segment portion (i.e., second torsional segment) 122. The first torsional segment 121 is coupled to (e.g., attached to) the first member 110 via a first coupling block portion (i.e., first coupling block) 125. The second torsional segment 122 is coupled to (e.g., attached to) the second member 115 via a second coupling block portion (i.e., second coupling block) 130. End portions (i.e., ends) of the torsional segments 120 are connected together by frame segment portions (i.e., frame segments). As shown in FIG. 1A, a first frame segment portion (i.e., first frame segment) 123 and a second frame segment portion (i.e., second frame segment) 124 couple the first torsional segment 121 and the second torsional segment 122.

In some implementations, an outside LET joint can include more than two torsional segments. In these embodiments, adjacent torsional segments can be connected together by frame segments to form pairs of torsional segments and the pairs of torsional segments can be coupled together by coupling blocks.

The outside LET joint shown in FIG. 1A is in an unfolded (i.e., planar) configuration. This configuration is typically the configuration of fabrication and can be a resting (i.e., equilibrium) state of the LET joint. In the unfolded configuration, the first member 110, the second member 115, and the torsional segments 120 are substantially aligned and define a plane (i.e., X-Y plane or fabrication plane). The plane defined in the unfolded state may serve as a reference to describe movements of the LET joint. For example, a movement of a planar member (i.e., lamina) may be described as emerging from the plane (i.e., lamina emergent).

Figure 1B:
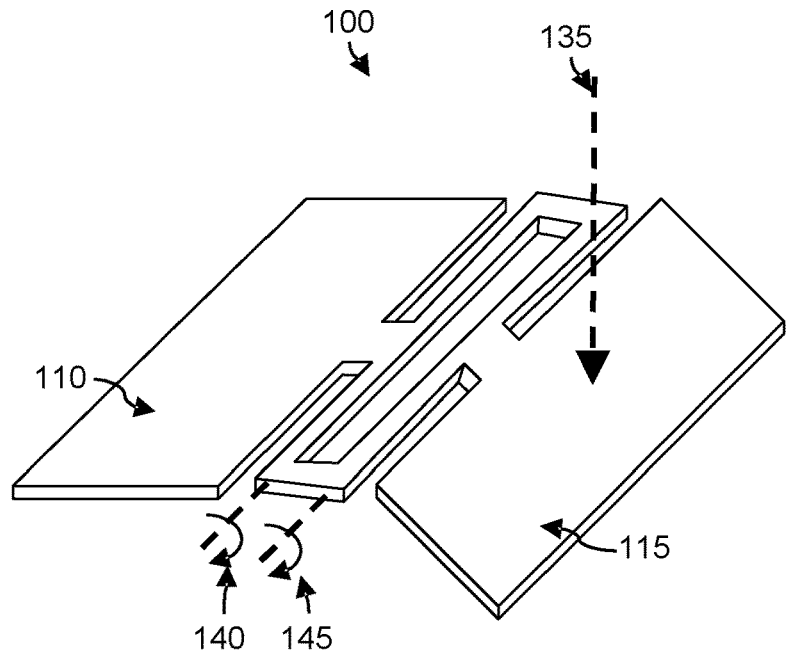
FIG. 1B is a perspective view of an outside LET joint in a possible folded configuration according to a possible implementation of the present disclosure.

FIG. 1B is a perspective view of the outside LET joint 100 in a possible folded configuration according to an implementation of the present disclosure. The first member 110 and the second member 115 can be configured into the folded configuration by a hinge movement made possible by a twisting motion of one or more of the torsional segments 120. As shown in FIG. 1B, a force 135 can be applied to a member (e.g., the second member 115) to produce a first twisting motion 140 of the first torsional segment 121 and a second twisting motion 145 of the second torsional segment 122. The twisting motion of each torsional segment can be different. The twisting of torsional segment is typically along a length portion (i.e., length) of the torsional segment that is between end portions of the torsional segments. As shown in FIG. 1A, the first frame segment 124 and a second frame segment portion are located at a first end portion and a second end portion of the torsional segments, respectively.

In some implementations, the folded configuration may be a static configuration, so that once configured, no additional force is necessary to maintain the folded configuration. Alternatively, the folded configuration may be a dynamic configuration so that the members are held at an angle to one another only while a force is applied, and after the force is removed, the members can be brought back to the unfolded condition by a spring action that untwists the torsional elements.

As shown in FIG. 1B, the applied force 135 can configure the relative positions of the first member 110 and the second member 115 so that they define an angle that has a vertex corresponding (e.g., approximately aligned spatially) to the torsional segments 120. In some implementations, the angle in the folded configuration can be any angle from a continuous range of angles (e.g., between 0 and 180 degrees). Further, the particular angle of the folded configuration can, in some implementations, correspond to a magnitude of the applied force 135 and/or a torsional stiffness (i.e., flexibility) of the torsional segments 120.

In some implementations, an increase in the flexibility of torsional segments 120 may facilitate an increase in an angular displacement and/or a decrease in the force required for the hinge movement. Increased flexibility, however, can allow for other movements in addition to (or instead of) the hinge movement. These other movements (i.e., parasitic movements) may be undesirable (i.e., unwanted) because they may negatively affect an accuracy of the hinge movement and/or a repeatability of the hinge movement by distorting the hinge movement and/or the resulting folded configuration. Additionally, these other movements may negatively affect a stability (e.g., the ability to maintain a position) of a LET joint and/or a durability (e.g., the number of movements before breakage) of the LET joint.

Figure 2A:
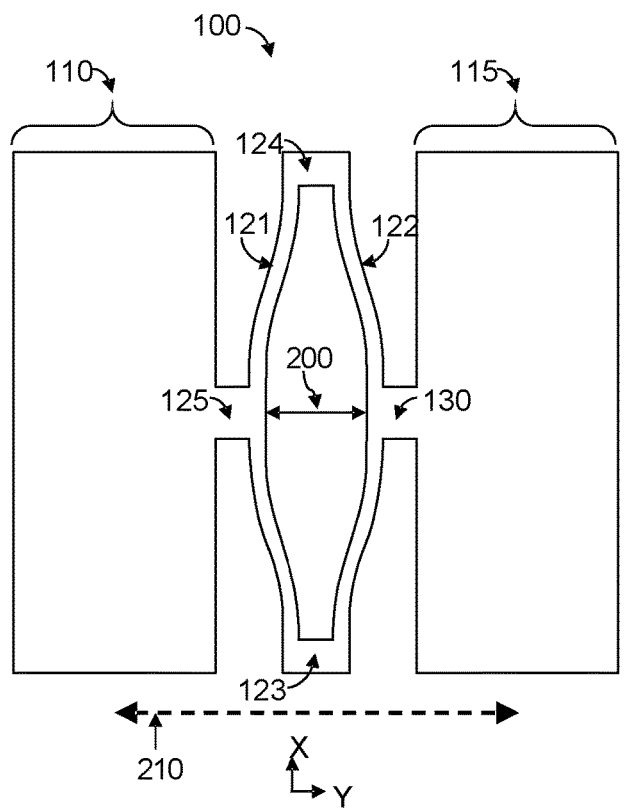
FIG. 2A is a plan view of an outside LET joint with a possible tensile deflection of the torsional segments according to a possible implementation of the present disclosure.

One example of an undesirable (i.e., other) movement that an outside LET joint can experience is shown in FIG. 2A. A tensile load (i.e., force) 210 applied (e.g., in the fabrication plane) on the first member 110 and/or the second member 115 can bend the torsional elemetns apart to increase a separation 200 between the first torsional segment 121 and the second torsional segment 122. Likewise, a compressive load (not shown) applied (e.g., in the fabrication plane) on the first member 110 and/or the second member 115 can bend the torsional elements together and decrease the separation 200 between the first torsional segment 121 and the second torsional segment 122. In addition to the negative effects described above, movement of an LET joint may be resisted or obstructed if, during operation, the separation 200 between torsional segments is reduced to zero (i.e., the torsional segments are brought into contact with one another).

Figure 2B:
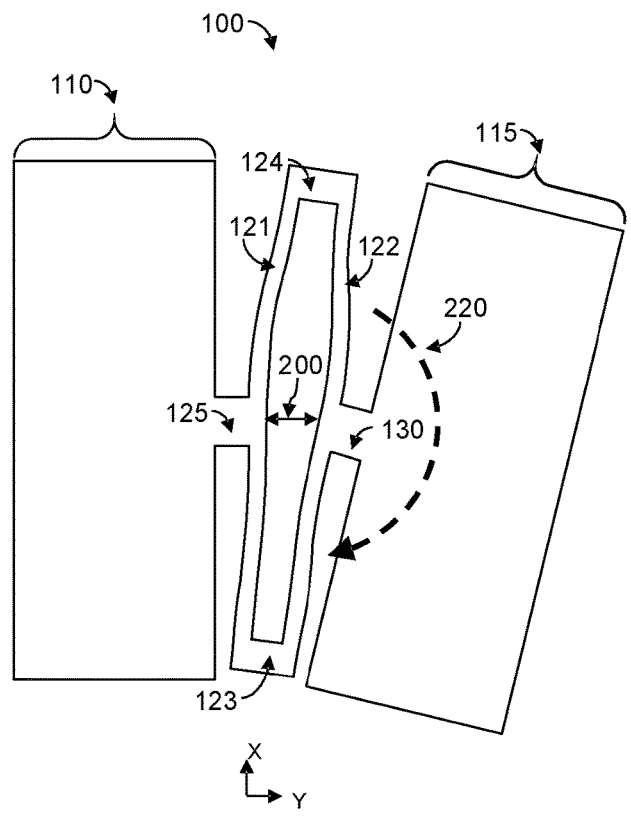
FIG. 2B is a plan view of an outside LET joint with a possible rotational deflection of the torsional segments according to a possible implementation of the present disclosure.

Another example of an undesirable (i.e., other) movement that an outside LET joint can experience is shown in FIG. 2B. As shown, a moment of force (i.e., moment) 220 applied (e.g., in the fabrication plane) on the second member 115 (and/or the first member 110) can rotate the second member 115 in the fabrication plane. Additionally, the rotational movement (i.e., deflection) can decrease the separation 200 between the first torsional segment 121 and the second torsional segment 122.

To prevent undesirable other (i.e., parasitic) movements (e.g., see FIG. 2A, FIG. 2B) without negatively affecting the desirable hinge movement (e.g., see FIG. 1B), a membrane can be affixed to the outside LET joint 100. The membrane can be affixed in a variety of ways including, but not limited to, adhering (i.e., bonding), fastening, or welding. Additionally, all or a portion of the membrane may be affixed to the outside LET joint 100. Integrating the membrane with the outside LET joint 100 to form an outside membrane-integrated LET joint (i.e., outside M-LET joint) may be accomplished using a bilayer architecture or a sandwhich architecture.

Figure 3A:
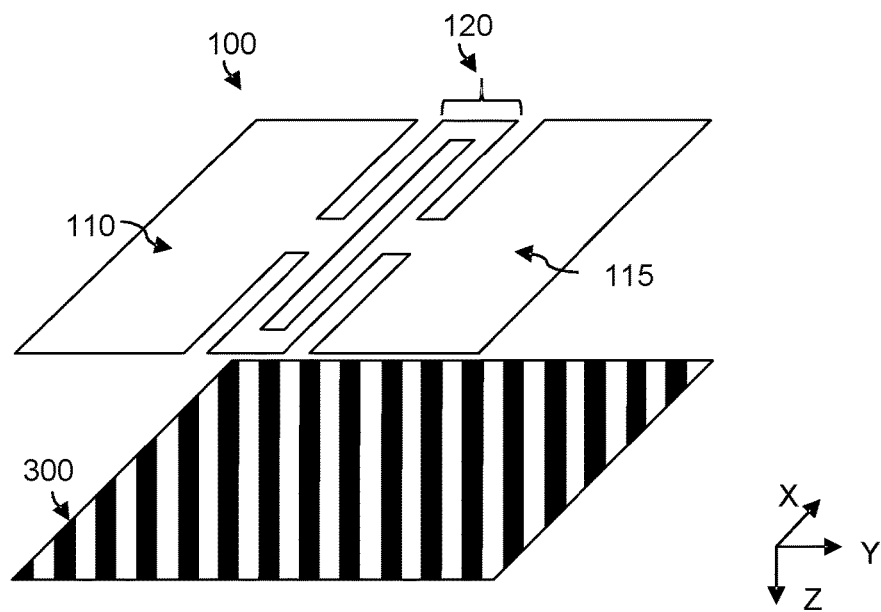
FIG. 3A is a perspective, exploded view of an M-LET joint having a bilayer architecture with a membrane entirely bonded an outside LET joint according to an implementation of the present disclosure.

FIG. 3A is a perspective, exploded view of an outside M-LET joint having a bilayer architecture with a membrane entirely bonded to an outside LET joint according to an implementation of the present disclosure. The membrane 300 is bonded to one side (i.e., one surface) of the outside LET joint 100 to form the bilayer architecture. For this implementation, the bonding is between the entire area of the membrane 300 (i.e., as indicated by crosshatching) and the first member 110, the second member 115 and the torsional segments 120. After bonding, the tensile strength of the membrane counteracts the in-plane (e.g., X-Y plane) tensile or rotational loading that could otherwise cause unwanted motions (e.g., FIG. 2A, FIG. 2B).

Figure 3B:
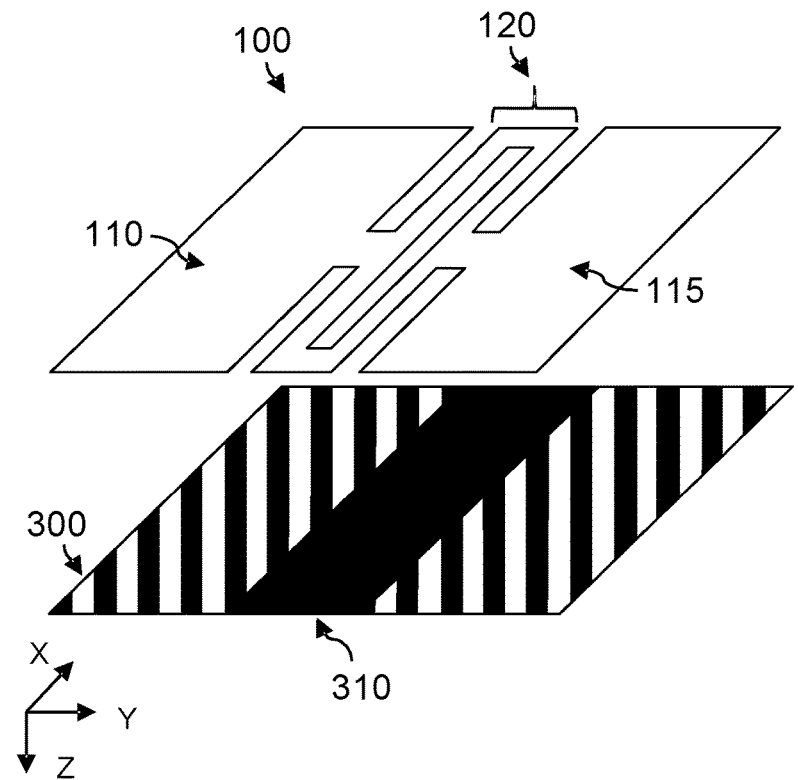
FIG. 3B is a perspective, exploded view of an M-LET joint having a bilayer architecture with the membrane partially bonded to an outside LET joint according to an implementation of the present disclosure.

FIG. 3B is a perspective, exploded view of an M-LET joint having a bilayer architecture with the membrane partially bonded to an outside LET joint according to an implementation of the present disclosure. The membrane 300 is bonded to one side of the outside LET joint 100 to form the bilayer architecture. For this implementation, the bonding is excluded over a portion of the membrane 300

(e.g., as indicated by dark shading in FIG. 3B) so that the membrane 300 is coupled to (e.g., adhered) to the first member 110 and the second member 115 but is not adhered to the torsional segments 120.

The membrane can reduce the LET joint's flexibility to the other (i.e., undesirable) movments without reducing the LET joint's flexibility for a hinge movement. The fully bonded (i.e., adhered) M-LET joint (i.e., FIG. 3A) may have a larger stiffnesses in the hinge motion than a partially bonded M-LET joint (i.e., FIG. 3B) due to the coupling between the bending deflections of the membrane and the torsional deflections of the torsional segments. Because of the twisting motion in the torsion segments 120, there may be a greater chance of membrane delamination in a fully bonded M-LET joint (FIG. 3A) than in the partially bonded M-LET joint (FIG. 3B). If delamination does occur in a fully bonded M-LET joint, then the M-LET joint may still function as a partially bonded M-LET joint.

Figure 4A:
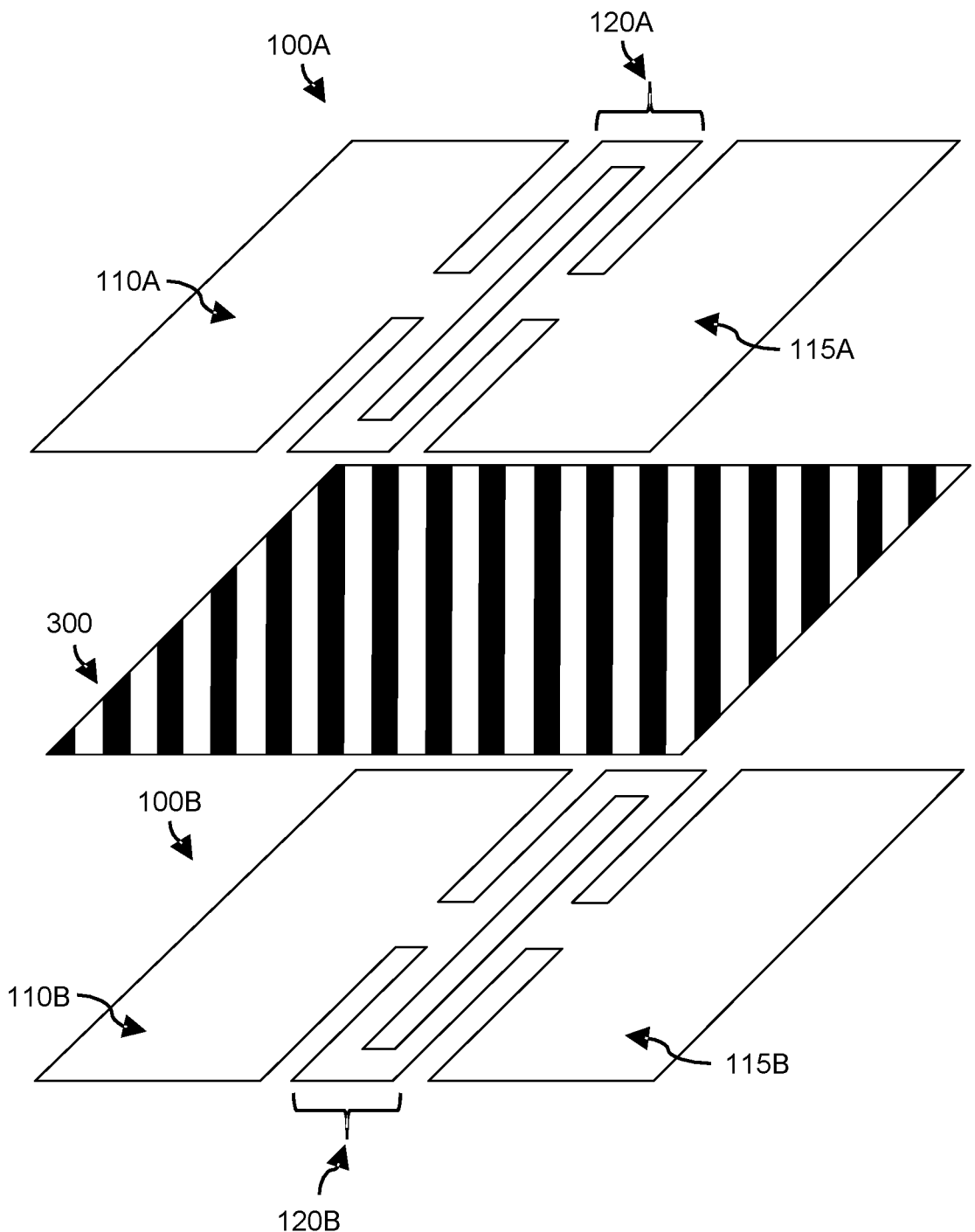
FIG. 4A is a perspective, exploded view of an M-LET joint having a sandwich architecture with a membrane entirely bonded between two outside LET joints according to an implementation of the present disclosure.

FIG. 4A is a perspective, exploded view of an M-LET joint having a sandwich architecture with a membrane integrated between two corresponding (e.g., substantially similar) outside LET joints. As shown, the membrane 300 is bonded between a first outside LET joint 100A and a second outside LET joint 100B, to form the sandwich architecture. For this implementation, the bonding is between the entire area of the membrane 300 (i.e., as indicated by crosshatching) and the first members 110A, 110B, the second members 115A, 115B, and the torsional segments 120A, 120B (and the coupling blocks) of the outside LET joints 100A, 100B.

Figure 4B:
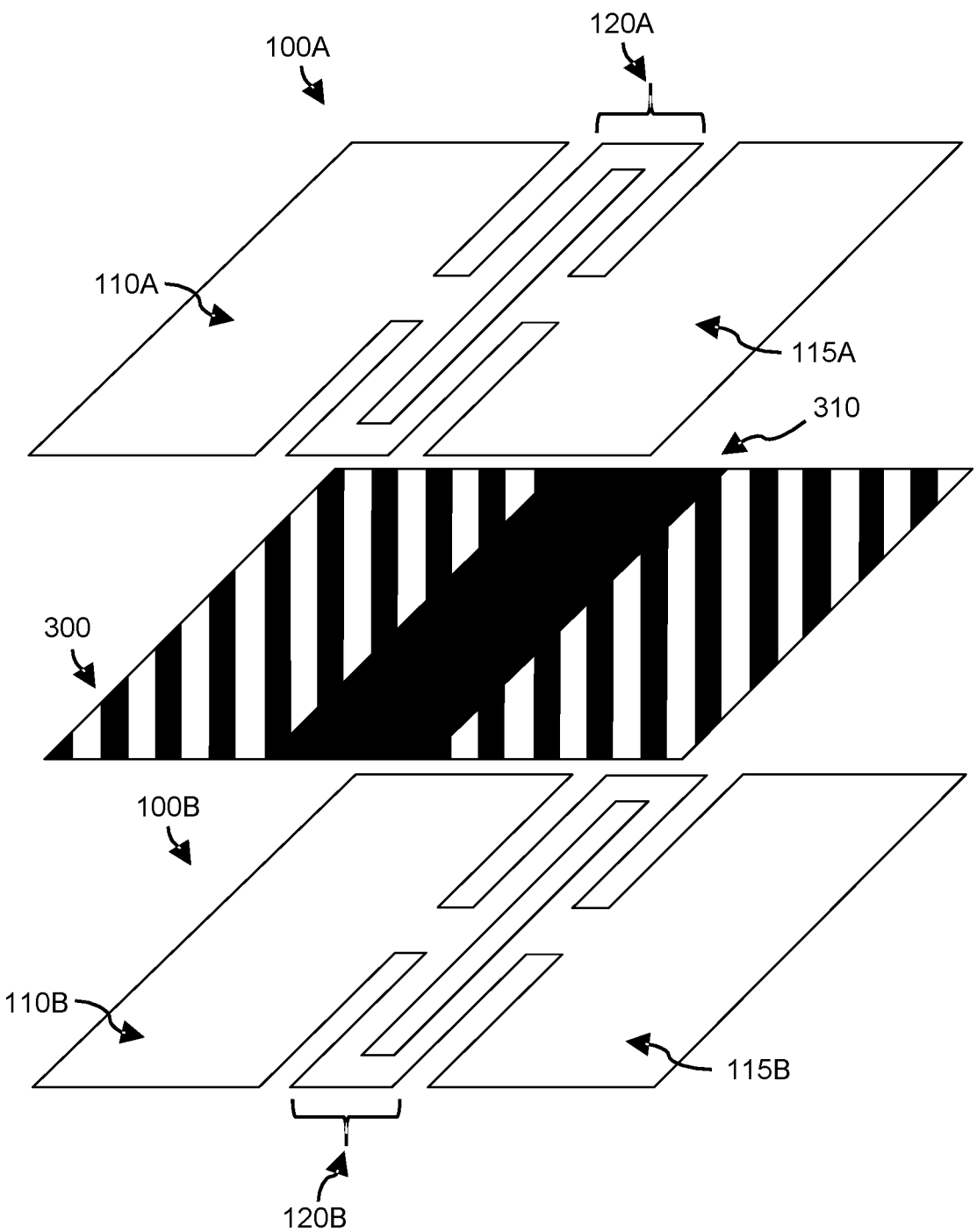
FIG. 4B is a perspective, exploded view of an M-LET joint having a sandwich architecture with a membrane partially bonded between two outside LET joints according to an implementation of the present disclosure.

FIG. 4B is a perspective, exploded view of a M-LET joint having a sandwich architecture with a membrane partially bonded between two outside LET joints according to an implementation of the present disclosure. As shown, the membrane 300 is bonded between a first outside LET joint 100A and a second outside LET joint 100B, to form the sandwich architecture. For this implementation, the bonding is excluded over a portion of the membrane 310 (e.g., as indicated by dark shading in FIG. 4B) so that the membrane 300 is adhered to the first members 110A, 110B, the second members 115A, 115B, but not the torsional segments 120A, 120B of the outside LET joints 100A, 100B.

The outside LET joints 100A and 100B are typically substantially similar in shape but may differ in thickness. Further, differences in the shapes of the outside LET joints 100A and 100B are possible as long as the hinge motion unaffected. For example, when the (in-plane) shape of the first member 110A is different from the (in-plane) shape of the corresponding first member 110B, hinge motion is unaffected if the torsional segments 120A, 120B (and the coupling blocks) are substantially similar (e.g., have the same size/shape).

There can be a significant distinction between a membrane 300 in tension and in compression. The membrane 300 can be stiff in tension but can buckle (i.e., fold, wrinkle) in compression. The difference between the tension and compression performance can be exploited to create unidirectional joints. For example, if the first member 110 and the second member 115 are folded together in a direction away from the membrane 300 (i.e., so that membrane forms the outer layer of the fold) then the membrane is placed in tension. Accordingly, the tension of the membrane may be used to resist, or prevent motion in one direction.

When the first member 110 and the second member 115 of are folded together in a direction towards the membrane 300 (i.e., so that first and second members form the outer layer in the fold) then the membrane is place in compression and buckling may occur. Buckling is less likely in a fully bonded M-LET joint than a partially bonded M-LET joint. Buckling can be further constrained by the containment of the membrane between LET joint layers in the sandwich architecture. In some implementations, at least one stop block feature may be used to further prevent buckling.

Figure 5:
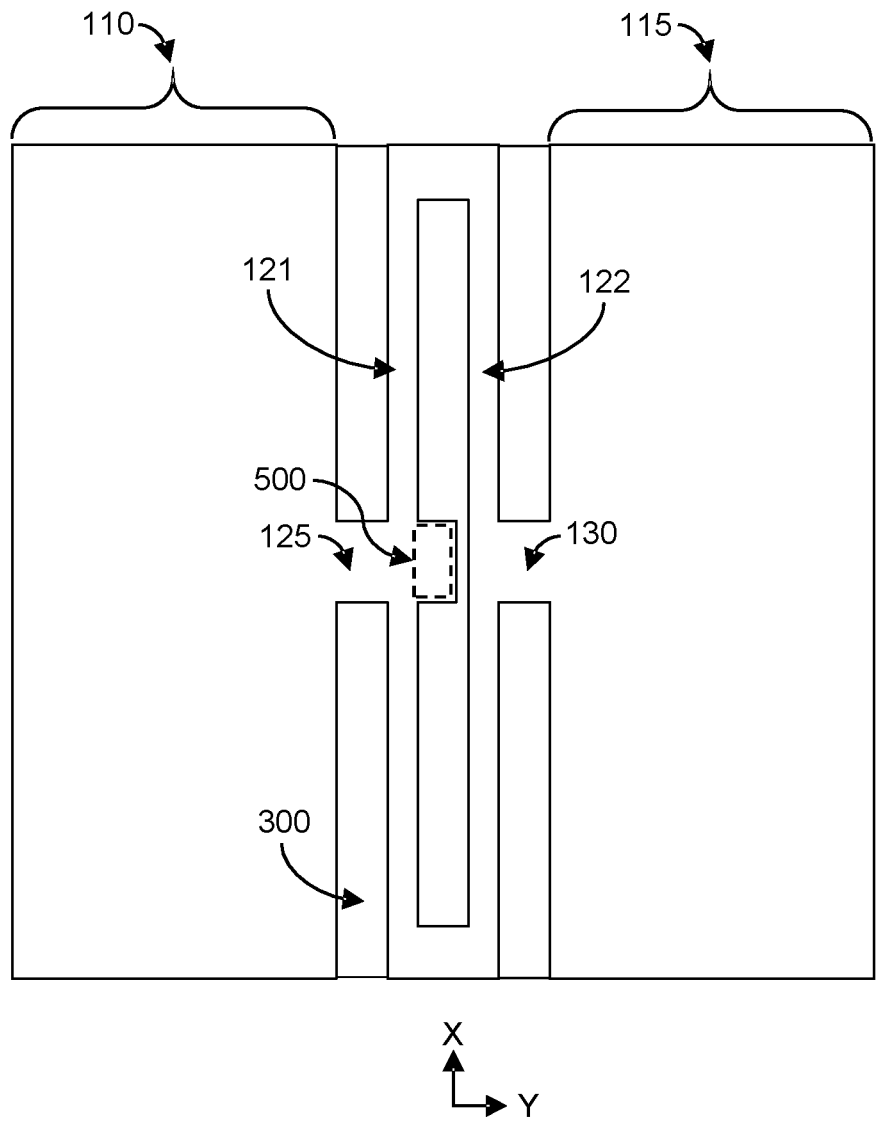
FIG. 5 is a plan view of an outside M-LET joint with a stop block according to a possible implementation of the present disclosure.

FIG. 5 is a plan view of a bilayer outside M-LET joint according to a possible implementation of the present disclosure. As shown, the M-LET joint includes a stop block portion (i.e., stop block) 500. The stop block 500 is contiguous to the first torsional segment 121 and aligned with the first coupling block 125. As shown, the stop block 500 reduces the separation between the first torsional segment 121 and the second torsional segment 122. This decreased separation limits the distance that the first torsional segment 121 and the second torsional segment 122 can be forced together. In some implementations, this limitation can prevent the membrane 300 from being compressed to the point of buckling. In some implementations, the stop block can also aid membrane in limiting a hinge motion to a single direction (e.g., in a unidirectional surrogate fold).

The bilayer outside M-LET joint can be used to create a unidirectional surrogate fold. For most origami-inspired designs, it is desirable to use unidirectionally rotatable joints for surrogate folds to ensure mountain and valley fold parity. Because origami-based mechanisms are often fabricated in the planar state, the as-fabricated position represents a change-point where joints could fold either up or down into either a mountain or a valley fold, so a joint architecture that defines the fold direction can be valuable. As shown in FIG. 5, the membrane 300 is glued on a back side of the LET joint with a stop block 500 for the purpose of preventing the adjacent members (e.g., first member 110 and second member 115) from folding up out of the flat plane (X-Y plane) at the fold (i.e., mountain fold).

Figure 6A:
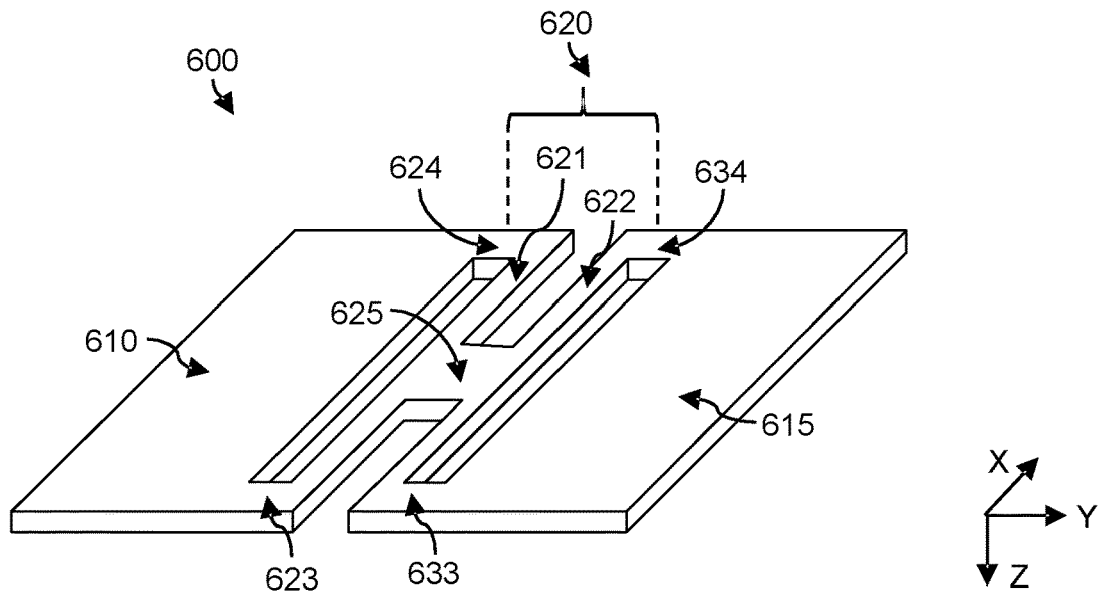
FIG. 6A is a perspective view of an inside LET joint in an unfolded configuration according to a possible implementation of the present disclosure.

LET joints may also be implemented by coupling a first member and a second member at interior edges of the two (or more) parallel sets of torsional segments. This implementation is known as an inside LET joint. A perspective view of an example of an inside LET joint (i.e., inside LET) is shown in FIG. 6A. The example inside LET joint 600 can be formed from a unitary piece of planar material and can include a first member portion (i.e., first member) 610, a second member portion (i.e., second member) 615, and a torsional segments portion 620. The number of torsional segments in an inside LET joint may be based on requirements of the LET joint, such as flexibility and bending radius. The implementation shown in FIG. 6A includes a first torsional segment portion (i.e., first torsional segment) 621 and a second torsional segment portion (i.e., second torsional segment) 624. The first torsional segment 621 is coupled to (e.g., directly coupled to) the second torsional segment 622 via a coupling block portion (i.e., coupling block) 625. Each end portion (i.e., end) of each torsional segment is connected to a member by a frame segment portion (i.e., frame segment). As shown in FIG. 6A, a first frame segment portion (i.e., first frame segment) 623 and a second frame segment portion (i.e., second frame segment) 624 couple the first torsional segment 621 to the first member 610. A third frame segment portion (i.e., third frame segment) 633 and a fourth frame segment portion (i.e., fourth frame segment) 634 couple the second torsional segment 622 to the second member 615. In some embodiments, the inside LET joint 600 can include more than two torsional segments. In these embodiments, adjacent torsional segments can be connected together by frame segments to form pairs of torsional segments and the pairs of torsional segments can be coupled together by coupling blocks.

Figure 6B:
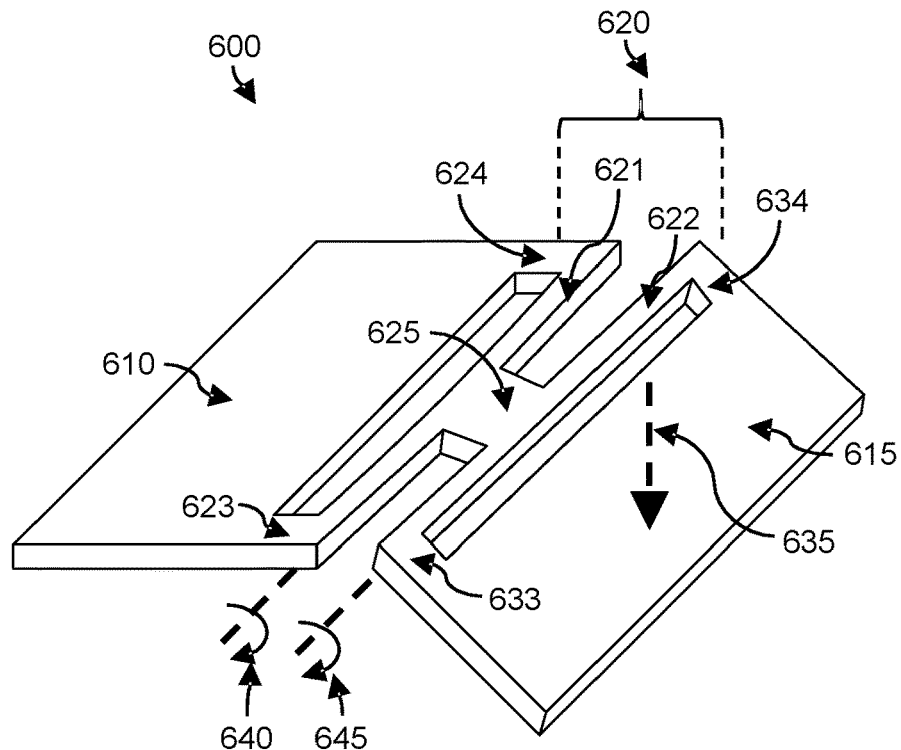
FIG. 6B is a perspective view of an inside LET joint in a possible folded configuration according to a possible implementation of the present disclosure.

FIG. 6B is a perspective view of the inside LET joint 600 in a possible folded configuration according to an implementation of the present disclosure. The first member 610 and the second member 615 can be configured into this folded configuration by a hinge movement made possible by twisting one or more of the torsional segments 620. As shown in FIG. 6B, a force 635 can be applied to a member (e.g., the second member 615) to produce a first twisting motion 640 of the first torsional segment 621 and a second twisting motion 645 of the second torsional segment 622. The twisting motion of each torsional segment can be along a length portion (i.e., length) of the torsional segment. The length portion of each torsional segment is located between end portions of the each torsional segment. As shown, the end portions of each torsional segment can be contiguous with a frame segment.

Inside LET joints function similarly to outside LET joints. Like outside LET joints, increased flexibility in torsional segments of an inside LET joint can allow for other movements (i.e., parasitic movements, unwanted movements, etc.) in addition to (or instead of) the hinge movement.

Figure 7A:
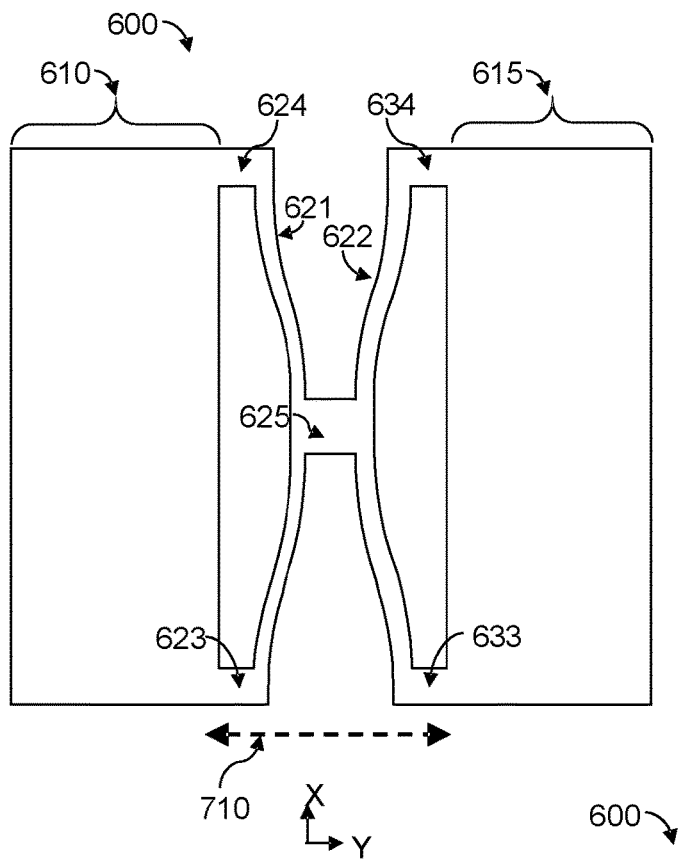
FIG. 7A is a plan view of an inside LET joint with a possible tensile deflection of the torsional segments according to a possible implementation of the present disclosure.

One example of an undesirable (i.e., other) movement that an inside LET joint can experience is shown in FIG. 7A. As shown, a tensile load (i.e., force) 710 applied (e.g., in the fabrication plane) on the first member 610 and/or the second member 615 can increase a separation between a first torsional segment 621 and the first member 610 and/or the second torsional segment 622 and the second member 615. Alternatively, a compressive load (not shown) applied between the first member 610 and the second member 615 can decrease a separation between the each torsional segment and its respective member.

Figure 7B:
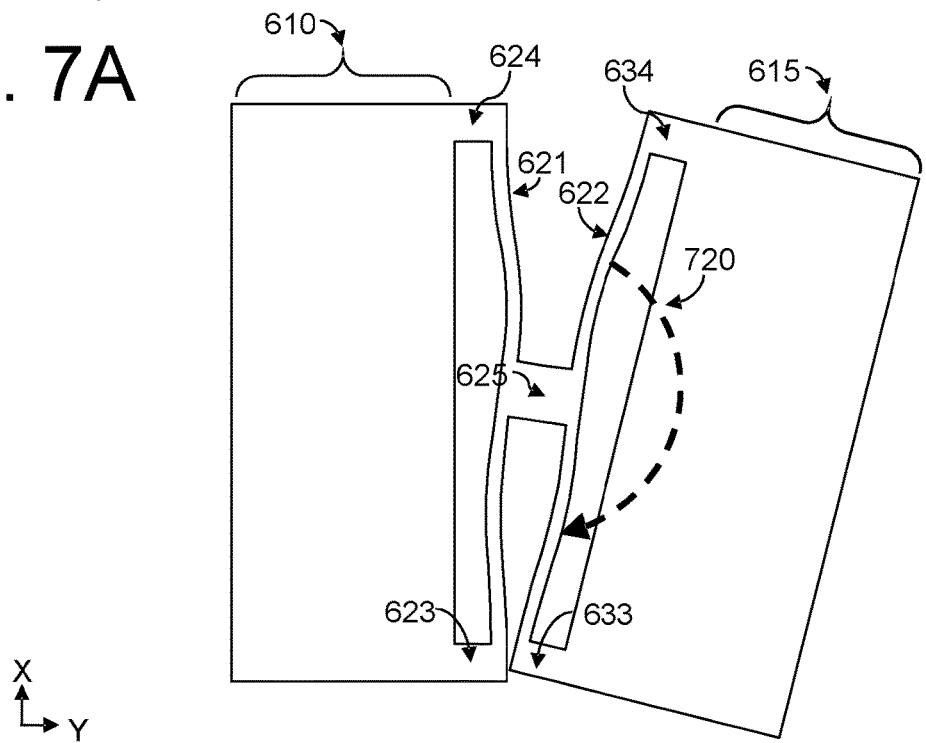
FIG. 7B is a plan view of an inside LET joint with a possible rotational deflection of the torsional segments according to a possible implementation of the present disclosure.

Another example of an undesirable (i.e., other) movement that an inside LET joint can experience is shown in FIG. 7B. As shown, a moment of force (i.e., moment) 720 applied (e.g., in the fabrication plane) on the second member 615 (and/or the first member 610) can rotate the second member 615 (i.e., relative to the first member 610) in the fabrication plane. Additionally, the rotational movement (i.e., deflection) can decrease the separation between the first torsional segment 621 and/or the second torsional segment 622 and its respective member.

As with the ouside let joint, to prevent undesirable other (i.e., parasitic) movements without negatively affecting the desirable hinge movement, a membrane can be coupled (e.g., bonded, fastened, welded, etc.) to the inside LET joint 600. Additionally, all or a portion of the membrane may be affixed to the inside LET joint 600 in a bilayer architecture or a sandwhich architecture.

Figure 8A:
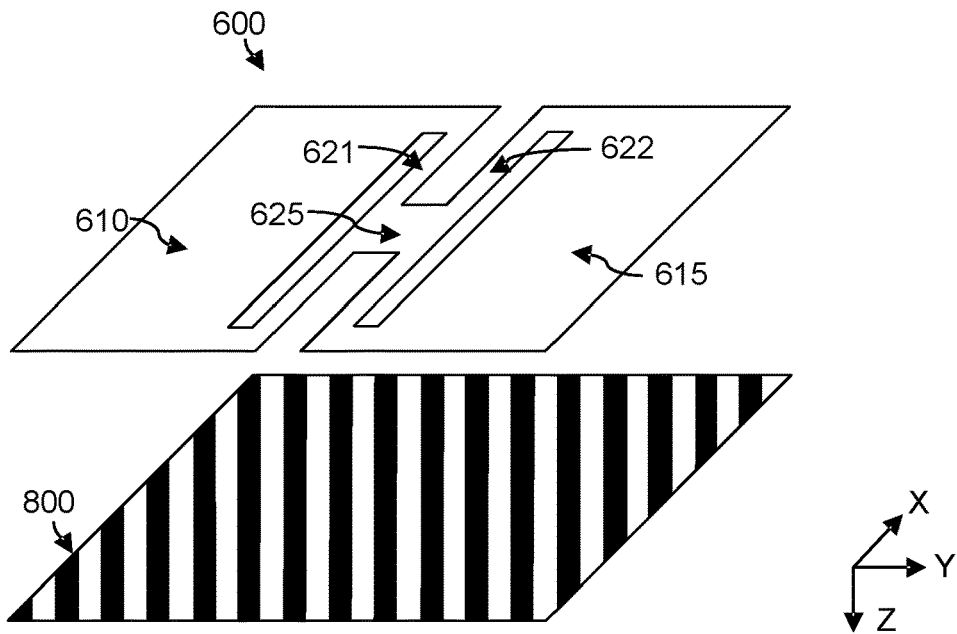
FIG. 8A is a perspective, exploded view of an M-LET joint having a bilayer architecture with a membrane entirely bonded to an inside LET joint according to an implementation of the present disclosure.

FIG. 8A is a perspective, exploded view of an inside M-LET joint having a bilayer architecture with a membrane 800 entirely bonded to an inside LET joint 600 according to an implementation of the present disclosure. The membrane 800 is bonded to one side of the inside LET joint 600 to form the bilayer architecture. For this implementation, the bonding is between the entire area of the membrane 800 (i.e., as indicated by crosshatching) and the first member 610, the second member 615, the coupling block 625, and the torsional segments 620 (e.g., the first torsional segment 621, and the second torsional segment 622). After bonding, the tensile strength of the membrane counteracts (i.e., resists) the in-plane (e.g., X-Y plane) tensile or rotational loading that could otherwise cause unwanted motions, such as shown I FIGS. 7A and 7B.

Figure 8B:
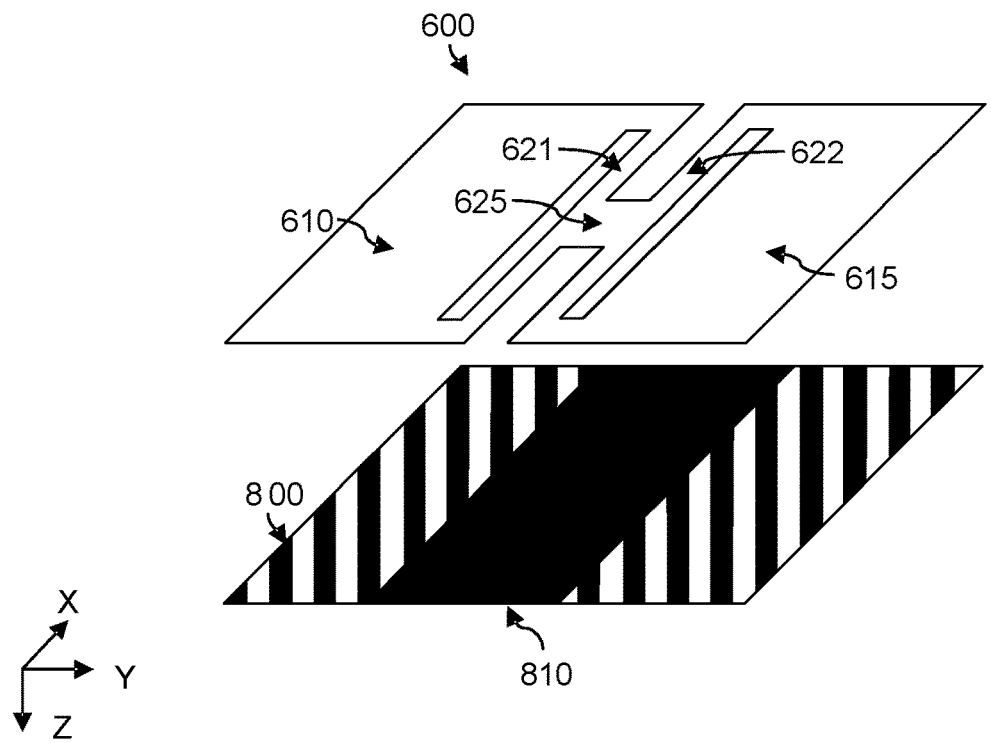
FIG. 8B is a perspective, exploded view of an M-LET joint having a bilayer architecture with a membrane partially bonded to an inside LET joint according to an implementation of the present disclosure.

FIG. 8B is a perspective, exploded view of an M-LET joint having a bilayer architecture with the membrane partially bonded to an inside LET joint according to an implementation of the present disclosure. The membrane 800 is bonded to one side of the outside LET joint 600 to form the bilayer architecture. For this implementation, the bonding is excluded over a portion of the membrane 810 (e.g., as indicated by dark shading in FIG. 8B) so that the membrane 800 is adhered to the first member 610 and the second member 615 but is not adhered to the torsional segments 620 (e.g., the first torsional segment 621, and the second torsional segment 622) of the coupling block 625.

Figure 9A:
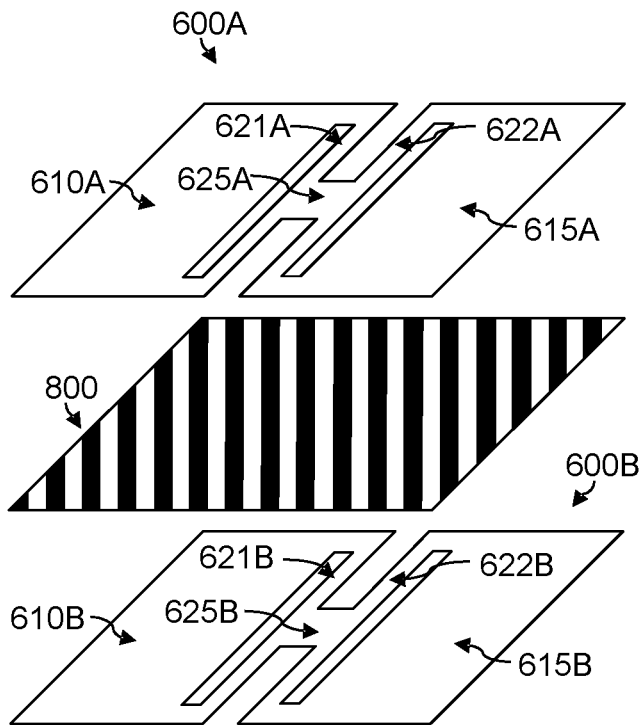
FIG. 9A is a perspective, exploded view of an M-LET joint having a sandwich architecture with a membrane entirely bonded between two inside LET joints according to an implementation of the present disclosure.

FIG. 9A is a perspective, exploded view of an inside M-LET joint having a sandwich architecture with a membrane integrated between two corresponding (e.g., similar) inside LET joints 600A, 600B. As shown, the membrane 800 is bonded between a first inside LET joint 600A and a second inside LET joint 600B to form the sandwich architecture. For this implementation, the bonding is between the entire area of the membrane 800 (i.e., as indicated by crosshatching) and the first members 610A, 610B, the second members 615A, 615B, the first torsional segments 621A, 621B, the second torsional segments 622A, 622B, and the coupling blocks 625A, 625B.

Figure 9B:
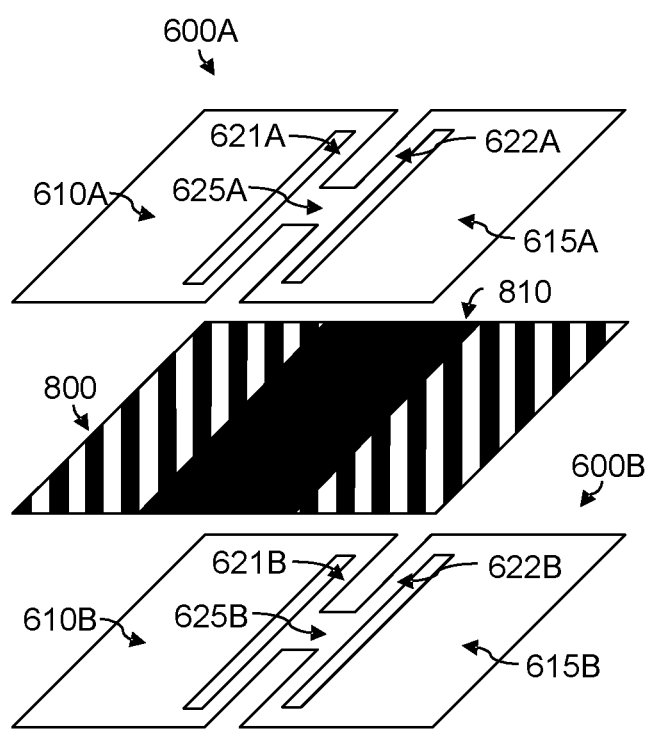
FIG. 9B is a perspective, exploded view of an M-LET joint having a sandwich architecture with a membrane partially bonded between two inside LET joints according to an implementation of the present disclosure.

FIG. 9B is a perspective, exploded view of a M-LET joint having a sandwich architecture with a membrane partially bonded between two inside LET joints according to an implementation of the present disclosure. As shown, the membrane 800 is bonded between a first inside LET joint 100A and a second inside LET joint 100B to form the sandwich architecture. For this implementation, the bonding is excluded over a portion of the membrane 810 (e.g., as indicated by dark shading in FIG. 9B) so that the membrane 800 is adhered to the first members 610A, 610B, the second members 615A, 615B, but not the first torsional segments 621A, 621B, the second torsional segments 622A, 622B, or the coupling blocks 625A, 625B.

The inside LET joints 600A and 600B are typically substantially similar in shape but may differ in thickness. Further, differences in the shapes of the inside LET joints 600A and 600B are possible as long as the hinge motion unaffected. For example, when the (in-plane) shape of the first member 610A is different from the (in-plane) shape of the corresponding first member 610B, hinge motion is unaffected if the torsional segments (and the coupling blocks) are substantially similar (e.g., have the same size/shape).

Figure 10:
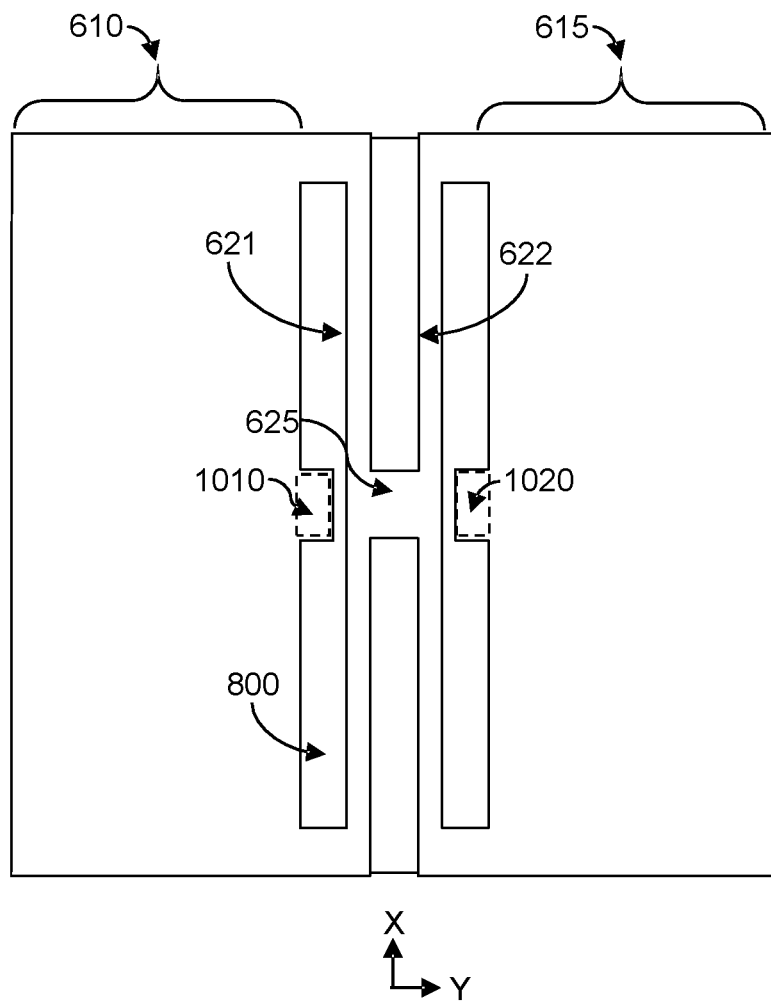
FIG. 10 is a plan view of an inside M-LET joint with stop blocks according to a possible implementation of the present disclosure.

In some implementations at least one stop block feature may be used in a inside M-LET join. As described previously, the stop blocks may help to prevent membrane buckling and to resist folding in a particular direction. FIG. 10 is a plan view of an inside M-LET joint with stop blocks according to a possible implementation of the present disclosure. As shown, the LET joint includes a first stop block portion (i.e., first stop block) 1010 and a second stop block portion (i.e., second stop block) 1020. The first stop block 1010 is contiguous with the first member 610 and the second stop block 1020 is contiguous with the second member 615. The stop blocks can each be aligned with the coupling block 625. The first stop block 1010 reduces the separation between the first member 610 and first torsional segment 621, while the second stop block 1020 reduces the separation between the second member 615 and the second torsional segment 622. The reduction in the separation prevents the membrane 800 from being compressed (i.e., in the Y-direction) to the point of buckling. In some implementations, the stop blocks can also aid membrane in limiting a hinge motion to a single direction (e.g., in a unidirectional surrogate fold).

The bilayer inside M-LET joint can be used to created a unidirectional surrogate fold. As shown in FIG. 10, the membrane 800 is glued on a back side of the inside LET joint with two stop blocks 1010, 102 added to prevent the adjacent members 610, 615 from folding up out of the flat plane (i.e., X-Y plane). The stop blocks 1010, 1020 also help to eliminate the risk of a buckling of the membrane.

Figure 11A:
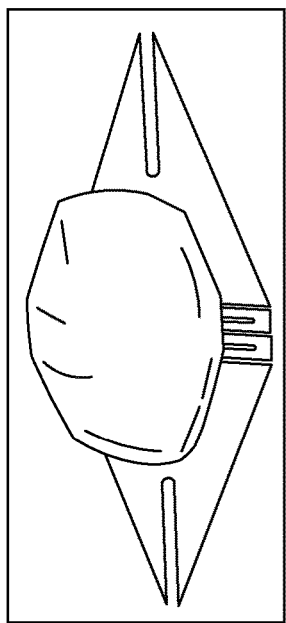
FIG. 11A is a perspective image of a membrane and an outside LET joint for a bilayer M-LET joint according to an implementation of the present disclosure.
Figure 11B:
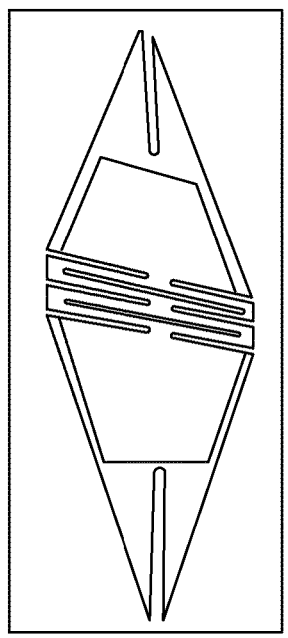
FIG. 11B is a perspective image of a bilayer outside M-LET joint in an unfolded configuration according to an implementation of the present disclosure.
Figure 11C:
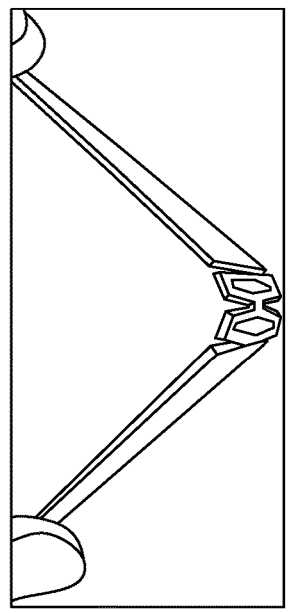
FIG. 11C is a perspective image of a bilayer outside M-LET joint in a possible folded configuration according to an implementation of the present disclosure.

FIG. 11A is a perspective image of a membrane and a LET joint and a bilayer M-LET joint prior to affixing the membrane to the LET joint. The joint is an outside LET joint with four torsional segments. In this implementation, the LET joint is constructed (e.g., machined) from a single sheet of polypropylene material and the membrane from metallic glass. FIG. 11B is a perspective image of a bilayer M-LET joint in an unfolded configuration after the membrane is affixed to the LET joint, and FIG. 11C is a perspective image of a bilayer M-LET joint in a folded configuration according to an implementation of the present disclosure.

The M-LET does not rely on the membrane for significant resistance to compressive forces. However, in the sandwich M-LET, the membrane is constrained between two LET layers, which provides considerable buckling resistance. Because the unsupported membrane lengths are small in a fully bonded M-LET, buckling also constrained.

Figure 12A:
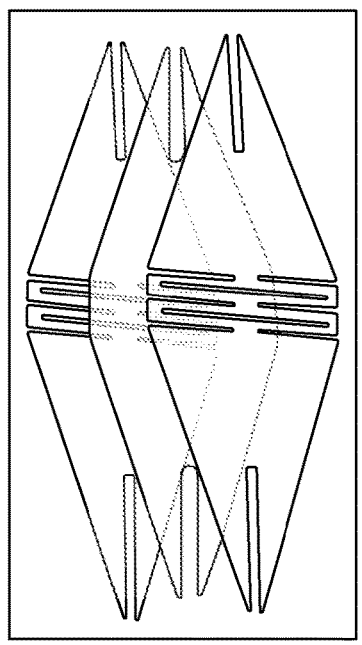
FIG. 12A is a perspective image of a membrane and two similar LET joints for a sandwich outside M-LET joint according to an implementation of the present disclosure.
Figure 12B:
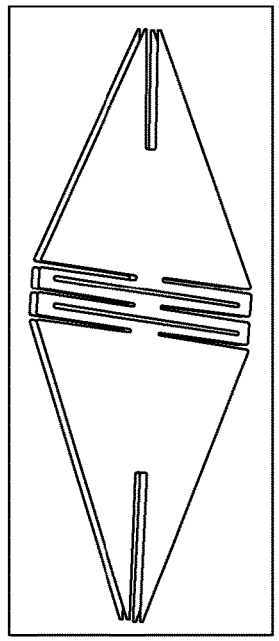
FIG. 12B is a perspective image of a sandwich outside M-LET joint in an unfolded configuration according to an implementation of the present disclosure.
Figure 12C:
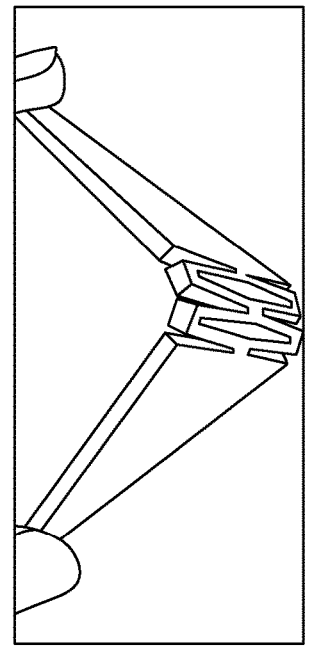
FIG. 12C is a perspective image of a sandwich outside M-LET joint in a possible folded configuration according to an implementation of the present disclosure.

FIG. 12A is a perspective image of a membrane and two LET joints for a sandwich M-LET joint according to an implementation of the present disclosure. The LET joints are substantially identical. Each LET joint is an outside LET joint with four torsional segments. In this implementation, each LET joint is constructed (e.g., machined) from a single sheet of polypropylene material and the membrane from metallic glass. FIG. 12B is a perspective image of the sandwich M-LET joint in an unfolded configuration after the membrane is affixed between the LET joints, while FIG. 12C is a perspective image of the sandwich M-LET joint in a folded configuration.

The M-LET joints may be used in a variety of compliant mechanism designs. For example, origami-based compliant mechanisms may include one or more surrogate folds that include an implementaion of an M-LET joint. An example origami-based compliant mechanism is the kaleidocyle.

Figure 13A:
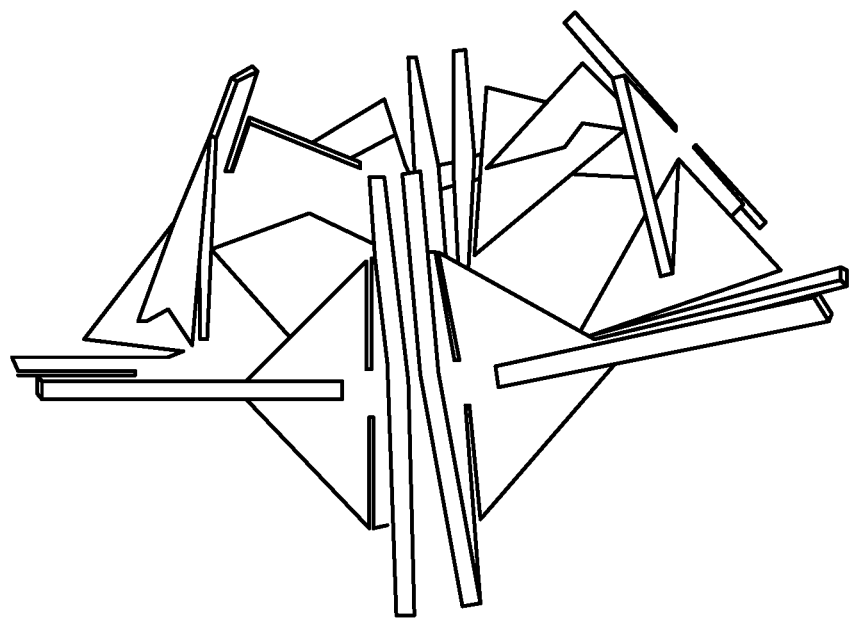
FIG. 13A is a perspective image of an origami kaleidocycle including six LET joints without integrated membranes.

Kaleidocycles are n-jointed linkages that allows infinite rotation. FIG. 13A is a perspective image of an origami kaleidocycle including six LET joints. In particular, FIG. 13A shows a fully compliant six-jointed kaleidocycle utilizing conventional LET joints. The LET joints without integrated membranes include displacments (e.g., distortions) at the joints caused by parasitic (e.g., in-plane rotation) movements of the LET joints. As shown, the distortions also result in contact between torsional segments.

Figure 13B:
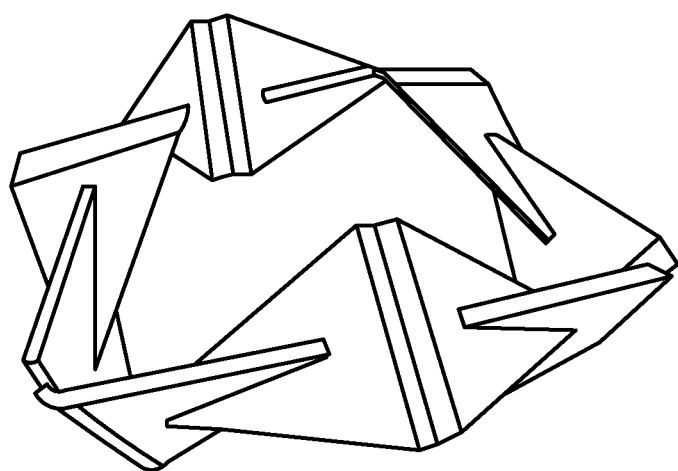
FIG. 13B is a perspective image of an origami kaleidocycle including six membrane-integrated LET joints.

FIG. 13B is a perspective image of an origami kaleidocycle including membrane integrated LET joints. In particular, FIG. 13B shows the kaleidocycle of FIG. 13A but with the LET joints replaced by M-LET joints (i.e., sandwich architecture, partially bonded). As shown, the deflections cause by parasitic motions have been reduced. Unlike the joints in FIG. 13A, there is negligible in-plane rotation deflection (e.g., see FIG. 2B), and there is no contact between torsional segments.

The membrane integrate lamina emergent torsional (M-LET) joints are relatively flexible in directions corresponding to a desired hinge motion but are relatively stiff in directions corresponding to undesired parasitic motions. The integration of M-LET joints as surrogate folds reduces parasitic motions and increase precision and repeatability. The membrane integrated arrangement can enable features that result in unidirectional motion, which is particularly helpful in guiding motion of origami-based mechanisms out of an initial flat state (which is also a change point) and into a desired configuration.

It will be understood that, in the foregoing description, when an element, such as a layer, a region, or component is referred to as being on, connected to, or coupled to, to another element, it may be directly on, connected or coupled to the other element, or one or more intervening elements may be present. In contrast, when an element is referred to as being directly on, directly connected to or directly coupled to another element or layer, there are no intervening elements or layers present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The invention claimed is:

1. A membrane-integrated lamina emergent torsional joint comprising:
   torsional segments that are substantially parallel to one another, each torsional segment capable of a twisting motion along a length between end portions of the torsional segment;
   a first member and a second member that are coupled by the torsional segments, and that can be configured into a folded configuration or an unfolded configuration by a hinge movement facilitated by the twisting motion of one or more of the torsional segments, wherein the first member, the second member, and the torsional segments form an inside LET joint configuration including the first member and the second member coupled by a coupling block at interior edges of the torsional segments; and a membrane coupled to at least the first member and the second member, the membrane configured to allow the hinge movement while reducing, or preventing, other movements.

2. The membrane-integrated lamina emergent torsional joint according to claim 1, wherein the torsional segments, the first member, the second member are formed from a planar sheet of material.

3. The membrane-integrated lamina emergent torsional joint according to claim 1, wherein in the folded configuration the first member and the second member define an angle with a vertex of the angle corresponding to the torsional segments.

4. The membrane-integrated lamina emergent torsional joint according to claim 3, wherein the angle of the folded configuration is greater than zero degrees and less than 180 degrees.

5. The membrane-integrated lamina emergent torsional joint according to claim 1, wherein in the unfolded configuration the first member, the second member, and the torsional segments substantially define a plane.

6. The membrane-integrated lamina emergent torsional joint according to claim 1, wherein the membrane is adhered to the first member, the second member, and the torsional segments.

7. The membrane-integrated lamina emergent torsional joint according to claim 1, wherein:
the membrane is adhered to the first member and the second member; and
the membrane is not adhered to the torsional segments.

8. The membrane-integrated lamina emergent torsional joint according to claim 1, wherein the inside LET joint configuration includes:
each torsional segment connected at a midpoint along its length to another torsional segment by the coupling block;
one of the torsional segments connected to the first member by first frame segments at each end of the torsional segment; and
another of the torsional segments connected to the second member by second frame segments at each end of the torsional segment.

9. The membrane-integrated lamina emergent torsional joint according to claim 1, further comprising a stop block to prevent the other movements in a direction that diminishes a separation between a corresponding torsional segment and member.

10. The membrane-integrated lamina emergent torsional joint according to claim 1, wherein:
the torsional segments, the first member, the second member are defined by a first planar sheet of material, and wherein the membrane-integrated lamina emergent torsional joint further includes:
a second planar sheet of material that defines torsional segments, a first member, and a second member that correspond to those of the first sheet, the second sheet and the first sheet bonded to and separated by the membrane.

11. The membrane-integrated lamina emergent torsional joint according to claim 1, wherein the hinge movement is unidirectional.

12. The membrane-integrated lamina emergent torsional joint according to claim 1, wherein the other movements include a tensile deflection of the torsional segments or a rotational deflection of the torsional segments.

13. A method for reducing a parasitic motion in a lamina emergent mechanism comprising:
coupling a membrane to a planar layer, the planar layer defining a plurality of torsional segments between a first member and a second member; and
folding the first member and the second member, wherein the folding includes:
applying a force to the first member or the second member, the applied force resulting in a twisting motion of at least one of the plurality of torsional segments and the parasitic motion of at least one of the plurality of torsional segments;
allowing, using the membrane, the twisting motion; and
resisting, using the membrane, the parasitic motion, wherein the lamina emergent mechanism is a an inside LET joint configuration including the first member and the second member coupled by a coupling block at interior edges of the plurality of torsional segments.

14. The method according to claim 13, further comprising:
coupling the membrane to a surface of a second planar layer, the second planar layer an approximate duplicate of the planar layer, and the membrane between the planar layer and the second planar layer.

15. The method according to claim 13, wherein the coupling the membrane to the planar layer includes:
bonding the membrane to the first member, the second member, and the plurality of torsional segments.

16. The method according to claim 13, wherein the coupling the membrane to the planar layer includes:
bonding the membrane to the first member and the second member; and
not bonding the membrane to the plurality of torsional segments.

17. A surrogate fold for an origami mechanism comprising:
a first member and a second member configurable into a folded configuration or an unfolded configuration based on movement provided by an inside lamina emergent torsional joint coupled between the first member and the second member, the inside lamina emergent torsional joint including the first member and the second member coupled by a coupling block at interior edges of a plurality of torsional segments; and
a membrane coupled to a planar surface defined by the first member and the second member in the unfolded configuration, the membrane allowing a first hinge movement of the inside lamina emergent torsional joint in a first direction and resisting a second hinge movement of the inside lamina emergent torsional joint in a second direction that is opposite to the first direction.

18. The surrogate fold for an origami mechanism according to claim 17, wherein the membrane is adhered to the first member and the second member and not adhered to torsional segments coupled between the first member and the second member.

* * * * *